US 9,855,979 B1

(12) United States Patent
Ness et al.

(10) Patent No.: US 9,855,979 B1
(45) Date of Patent: Jan. 2, 2018

(54) SLIDING AND ROTATING BED DIVIDER

(71) Applicant: FORD GLOBAL TECHNOLOGIES, LLC, Dearborn, MI (US)

(72) Inventors: Kyle Ness, Royal Oak, MI (US); Pattrick Loew, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/257,037

(22) Filed: Sep. 6, 2016

(51) Int. Cl.
*B62D 33/02* (2006.01)
*B60P 7/14* (2006.01)

(52) U.S. Cl.
CPC .......... *B62D 33/02* (2013.01); *B60P 7/14* (2013.01)

(58) Field of Classification Search
CPC .... B60P 7/135; B60P 7/14; B60P 7/15; B62D 33/02; B60R 9/06
USPC ........... 296/24.4, 24.43, 37.6; 410/129, 130, 410/135; 224/403, 522, 523, 532
See application file for complete search history.

(56) References Cited

U.S. PATENT DOCUMENTS

| | | | |
|---|---|---|---|
| 4,236,854 A * | 12/1980 | Rogers | B60P 7/15 410/121 |
| 4,770,579 A * | 9/1988 | Aksamit | B60P 7/15 410/120 |
| 4,772,165 A * | 9/1988 | Bartkus | B60P 7/15 211/7 |
| 5,082,404 A * | 1/1992 | Stewart | B60P 7/135 224/325 |
| 5,427,487 A * | 6/1995 | Brosfske | B60P 7/15 410/121 |
| 5,509,764 A * | 4/1996 | Shives | B60P 7/15 410/149 |
| 5,697,742 A | 12/1997 | House | |
| 5,971,685 A | 10/1999 | Owens | |
| 6,206,624 B1 * | 3/2001 | Brandenburg | B60P 7/14 410/121 |
| 6,582,167 B1 * | 6/2003 | Sugata | B23B 31/261 408/59 |
| 8,100,615 B1 * | 1/2012 | Freeborn | B60P 7/14 410/130 |
| 2005/0036849 A1 * | 2/2005 | Kiester | B60P 7/14 410/129 |
| 2005/0152761 A1 * | 7/2005 | Silamianos | B60P 7/14 410/130 |
| 2009/0226277 A1 * | 9/2009 | Hill | B61D 45/006 410/130 |
| 2009/0250962 A1 * | 10/2009 | Polewarczyk | B62D 33/0273 296/57.1 |
| 2014/0169906 A1 | 6/2014 | Hibbard | |
| 2015/0063938 A1 | 3/2015 | Peters et al. | |
| 2015/0158411 A1 * | 6/2015 | Pakulak | B60P 7/0807 410/143 |
| 2015/0183363 A1 | 7/2015 | Puchkoff | |
| 2016/0082875 A1 * | 3/2016 | Squyres | B60P 7/14 410/129 |

* cited by examiner

*Primary Examiner* — Gregory Blankenship
(74) *Attorney, Agent, or Firm* — Jason Rogers; King & Schickli, PLLC

(57) ABSTRACT

A bed divider is provided for a bed of a truck. The bed divider includes a first guide track extending along a first axis and a second guide track extending along a second axis. The second guide track is displaceable along the first guide track. The bed divider also includes a carrier displaceable along the second guide track and a partition depending from the carrier.

20 Claims, 6 Drawing Sheets

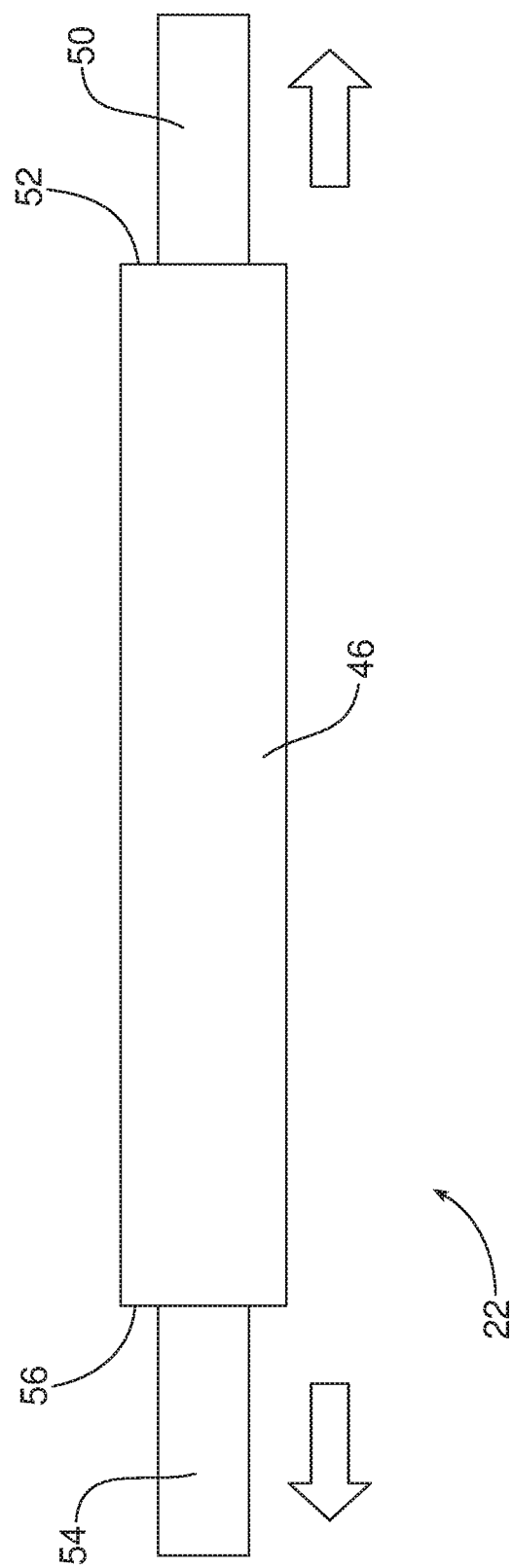

SLIDING AND ROTATING BED DIVIDER

TECHNICAL FIELD

This document relates generally to the motor vehicle equipment field and, more particularly, to a bed divider for a cargo bed of a truck that is slidable along two tracks in two different directions and also able to be angularly oriented as desired. Advantageously, the multiple degrees of adjustability available increase the versatility and utility of the bed divider allowing it to function effectively for substantially any foreseeable application.

BACKGROUND

Trucks, such as pickup trucks, are equipped with large cargo beds to receive and hold large cargo items such as sheets of plywood, sheets of drywall and the like. Of course, large cargo beds suitable for this purpose may present a problem with respect to transporting and securing smaller cargo items.

In order to address this issue, truck bed dividers have been developed in order to partition the cargo bed into smaller, defined spaces suitable for transporting smaller cargo items. While useful for their intended purpose, truck bed dividers developed to date often suffer from limited adjustability that effectively limits their versatility and effective use for many applications.

This document relates to a new and improved bed divider that is very easy to use and may be adjusted longitudinally, laterally and angularly to thereby provide enhanced versatility suited to a wide range of applications.

SUMMARY

In accordance with the purposes and benefits described herein, a new and improved bed divider is provided for a bed of a truck. That bed divider comprises a first guide track extending along a first axis and a second guide track extending along a second axis. The second guide track is displaceable along the first guide track. In addition the bed divider includes a carrier displaceable along the second guide track and a partition that depends from the carrier and functions to divide the bed of the truck into multiple cargo areas.

In some possible embodiments, the first axis corresponds to an X-axis of the truck and the second axis corresponds to a Y-axis of the truck as per the SAE vehicle axis system.

The partition may comprise a first panel mounted by a rotatable connector to the carrier, a second panel telescopingly received in a first end of the first panel and a third panel telescopingly received in a second end of the first panel. The rotatable carrier provided between the carrier and the partition allows the partition to be angled with respect to the carrier.

The bed divider may also include a second carrier displaceable along the second guide track and a second partition depending from the second carrier.

In some embodiments, the first guide track of the bed divider includes a first guide rail and a second guide rail. The second guide track may include a first slide at a first end and a second slide at a second end. The first slide may be adapted to slide along the first guide rail while the second slide may be adapted to slide along the second guide rail.

A first lock may be provided to fix the second guide track in a first operating position along the first guide track. A second lock may be provided to fix the carrier in a second operating position along the second guide track. Further, a third lock may be provided to fix the partition at a selected angle with respect to the carrier.

As previously noted, the partition may comprise a first panel mounted by a rotatable connector to the carrier, a second panel telescopingly received in a first end of the first panel and a third panel telescopingly received in a second end of the first panel. A fourth lock may be provided to fix the second panel with respect to the first panel and a fifth lock may be provided to fix the third panel with respect to the first panel.

The bed divider may further include a second carrier displaceable along the second guide track and a second partition depending from the second carrier. This second partition may comprise a fourth panel mounted by a second rotatable connector to the second carrier, a fifth panel telescopingly received in a third end of the fourth panel and a sixth panel telescopingly received in a fourth end of the fourth panel.

In addition, the bed divider may further include a sixth lock to fix the second carrier in a third operating position along the second guide track. Further, the bed divider may include a seventh lock to fix the second partition at a second selected angle with respect to the second carrier. Still further, the bed divider may further include an eighth lock to fix the fifth panel with respect to the fourth panel and a ninth lock to fix the sixth panel with respect to the fourth panel.

Still further, the second guide track of the bed divider may include a third guide rail and a fourth guide rail. Further, the second guide track may include a plurality of locking apertures and the second lock may comprise a pin received in a fixing aperture in the carrier and one of the plurality of locking apertures in the second guide track. Further, the third lock may comprise a threaded knob received on a threaded shaft attached to the partition thereby making the third lock an integral part of the rotatable connector.

In the following description, there are shown and described several preferred embodiments of the bed divider. As it should be realized, the bed divider is capable of other, different embodiments and its several details are capable of modification in various, obvious aspects all without departing from the bed divider as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the bed divider and together with the description serve to explain certain principles thereof. In the drawing figures:

FIG. 3 is a detailed schematic illustration of the partition depending from the carrier in FIG. 2 and showing its telescoping structure.

Figure 1:
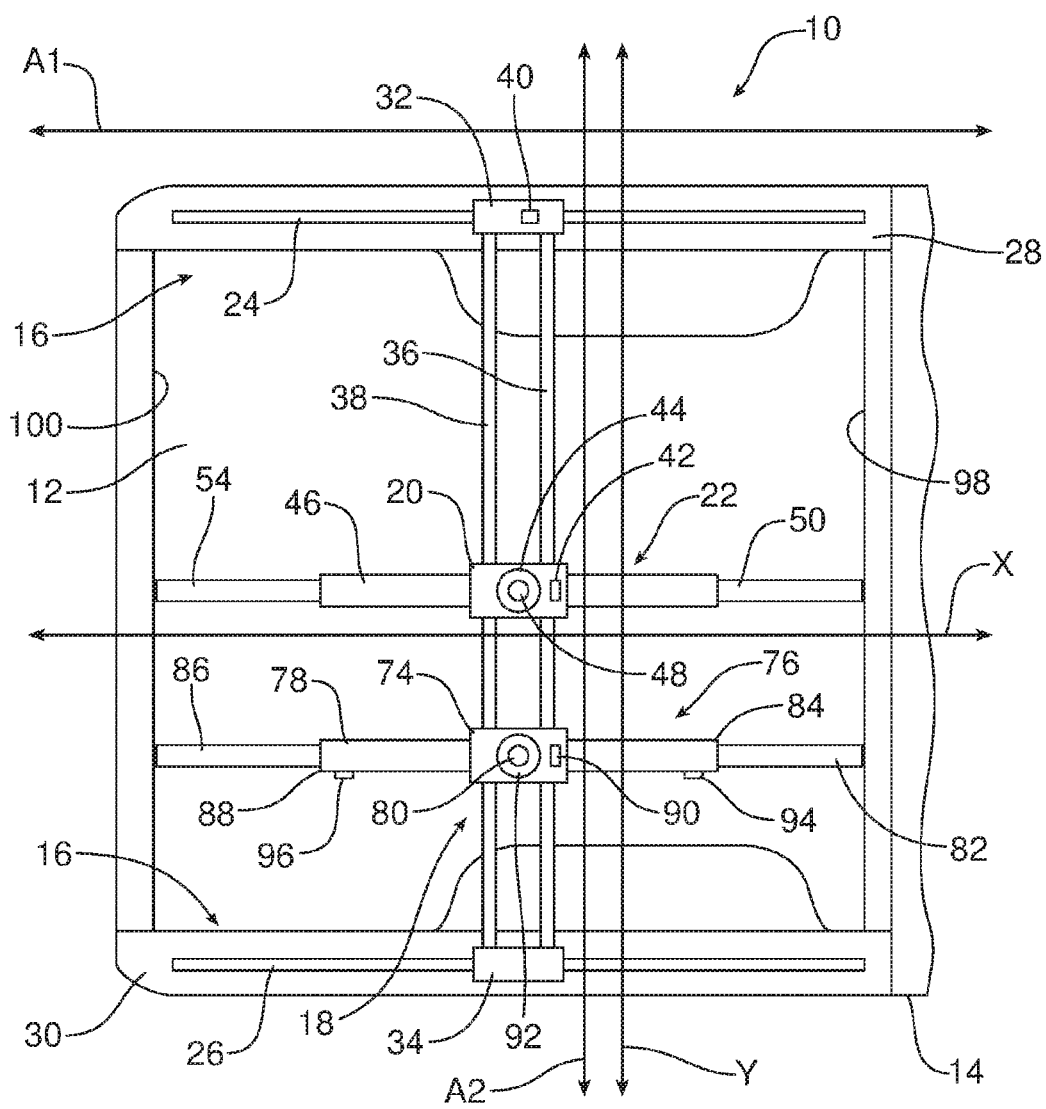
FIG. 1 is a top plan view illustrating the bed divider for partitioning the cargo bed of a truck into multiple cargo areas.

Reference will now be made in detail to one possible embodiment of the bed divider, as illustrated in the accompanying drawing figures.

DETAILED DESCRIPTION

Reference is now made to FIGS. 1-4c illustrating a bed divider 10 for partitioning a load or cargo bed 12 of a truck 14 into multiple, smaller cargo areas better suited to a particular small cargo application.

As illustrated, the bed divider 10 includes a first guide track extending along or parallel to a first axis A1, a second guide track 18 extending along or parallel to a second axis A2, a carrier 20 displaceable along the second guide track and a partition 22 depending from the carrier.

In the illustrated embodiment, the first guide track 16 comprises a first guide rail 24 and a second guide rail 26. As shown, the first guide rail 24 extends along the top of the first truck bed sidewall 28 while the second guide rail 26 extends along the top of the second truck bed sidewall 30. Thus, in the illustrated embodiment, the first axis A1 extends parallel to the longitudinal or X axis of the truck 14.

The second guide track 18 includes a first slide 32 at a first end and a second slide 34 at a second end. As illustrated, the first slide 32 is received on and slides along the first guide rail 24 while the second slide 34 is received on and slides along the second guide rail 26. Thus, it should be appreciated that the second guide track 18 is displaceable along the first guide track 16 so as to be positionable anywhere along the longitudinal axis X of the bed 12. In the illustrated embodiment the second axis A2 extends parallel to the lateral or Y-axis of the truck 14.

As illustrated, the second guide track 18 includes a third guide rail 36 and a fourth guide rail 38 extending laterally between the first slide 32 and the second slide 34. Here it should be appreciated that this two-rail structure for the second guide track 18 should merely be considered as exemplary rather than limiting in scope.

As illustrated in FIG. 1, a first lock, schematically illustrated at 40, allows an operator to fix the second guide track 18 in a first operating position substantially anywhere along the length of the first guide track 16. A second lock, schematically illustrated at 42, allows an operator to fix the carrier 20 in a second operating position that may be selected substantially anywhere along the length of the second guide track 18. A third lock 44 allows an operator to fix the partition 22 at substantially any selected angle with respect to the carrier 20.

Figure 2:
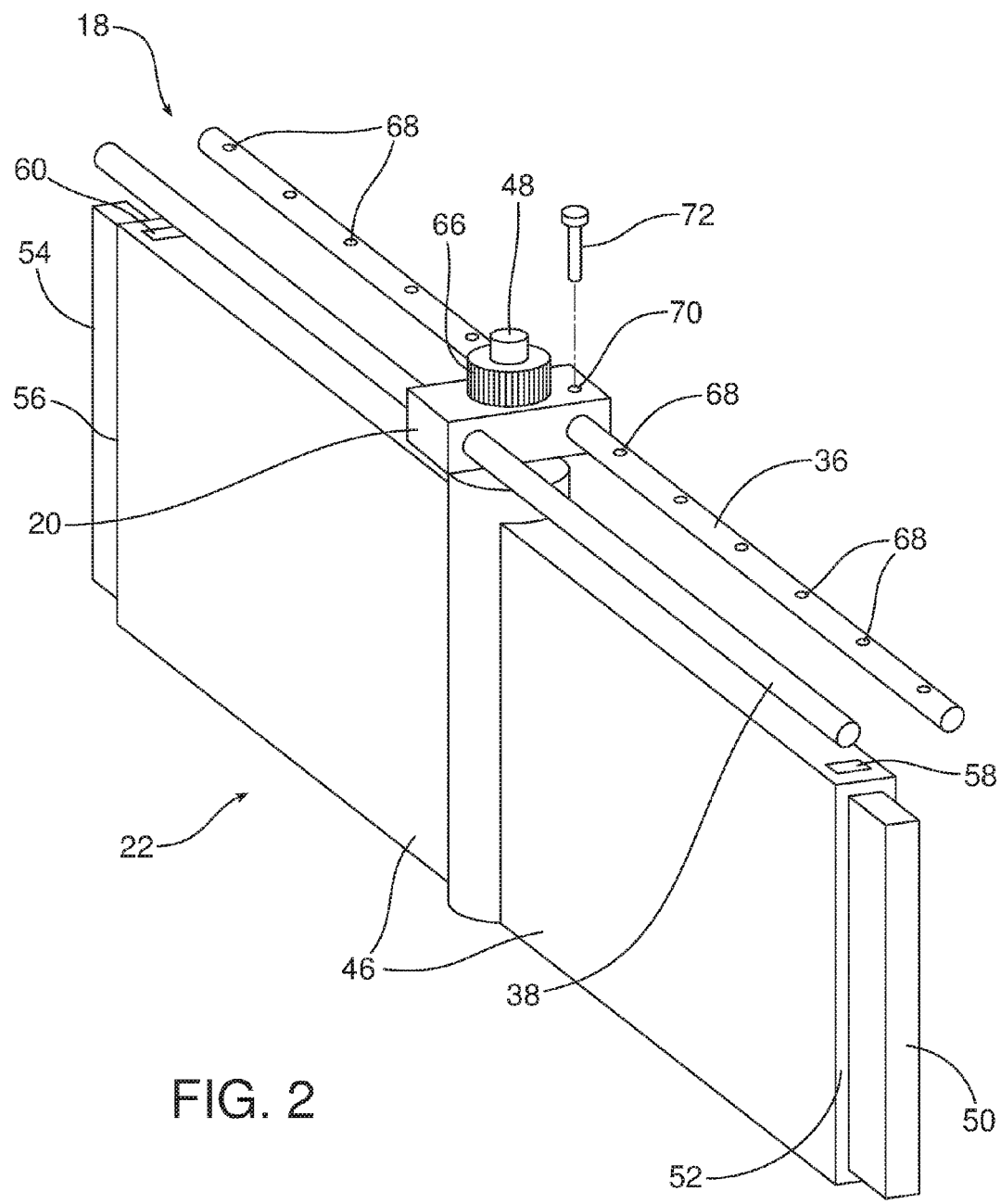
FIG. 2 is a detailed perspective view illustrating a carrier displaceable along a second guide track of the bed divider and the partition that depends from that carrier.

As best illustrated in FIGS. 2 and 3, the partition 22 may comprise a first panel 46 mounted by a rotatable connector 48 to the carrier 20, a second panel 50 telescopingly received in a first end 52 of the first panel and a third panel 54 telescopingly received in a second end 56 of the first panel. A fourth lock, schematically illustrated at 58 allows an operator to fix the second panel 50 with respect to the first panel 46 while a fifth lock, schematically illustrated at 60 allows one to fix the third panel 54 with respect to the first panel 46.

As illustrated in FIG. 2, the rotatable connector 48 comprises a threaded shaft attached or fixed to the first panel 46 of the partition 22 and extending freely through an aperture in the carrier 20. A knurled knob 66 is secured on the threaded shaft/rotatable connector 48 at the opposite side of the carrier 20. In one possible embodiment, the knob 66 may be tightened down on the shaft/connector 48 against the carrier 20 so as to function as the third lock 40, thereby making the third lock an integral part of the rotatable connector 48.

As illustrated in FIG. 2, the second guide track 18 may include a plurality of locking apertures 68. In the illustrated embodiment, those locking apertures 68 are shown as being spaced along and provided in the third guide rail 36. A fixing aperture 70 is provided in the carrier 20. In this embodiment, the second lock 42 comprises a pin 72 that is inserted through the fixing aperture 70 in the carrier 20 into any one of the plurality of locking apertures 68 in the third guide rail 36 that are aligned at the time with the fixing aperture. Thus, the pin 72 functions to fix the carrier 20 at a desired, selected position along the second guide track 18.

As further illustrated in FIG. 1, the bed divider 10 may further include a second carrier 74 that is displaceable along the second guide track 18 and a second partition 76 depending from the second carrier.

In the illustrated embodiment, the second partition 76 comprises a fourth panel 78 mounted by a second rotatable connector 80 to the second carrier 74, a fifth panel 82 telescopingly received in a third end 84 of the fourth panel and a sixth panel 86 telescopingly received in a fourth end 88 of the fourth panel. As illustrated, the second rotatable connector 80 may be identical to the first rotatable connector 48 described above and illustrated in FIG. 2. A sixth lock 90 may be provided to fix the second carrier 74 in a third operating position along the second guide track 18. A seventh lock 92 may be provided to fix the second partition 76 at a second selected angle with respect to the second carrier 74. Further, an eighth lock 94 may be provided to fix the fifth panel 82 with respect to the fourth panel 78 and a ninth lock 96 may be provided to fix the sixth panel 86 with respect to the fourth panel 78.

From the above description, it should be appreciated that the second guide track 18 may be selectively positioned as desired by the operator anywhere along the length of the first guide track 16 running from the front end 98 of the bed 12 to the rear end 100 of the bed 12. In effect, the second guide track 18 is infinitely adjustable along the first guide track 16 in a longitudinal direction along the first axis A1 which is parallel to the X-axis of the truck 14.

The first carrier 20 may be positioned at substantially any point along the second guide track 18 thereby allowing infinite lateral adjustability between the first slide 32 at the first truck bed sidewall 28 and the second slide 34 at the second truck bed sidewall 30. Similarly, the second carrier 74 enjoys the same infinite adjustability of the first carrier 20 along the second guide track 18 with each carrier 20, 74 being independently adjustable.

In addition, the angle of the first partition 22 on the carrier 20 may be infinitely adjusted through an arc of 360 degrees. Similarly, the angle of the second partition 76 on the second carrier 74 may be infinitely adjusted through an arc of 360 degrees. Advantageously, the angle of both partitions 22, 76 may be adjusted independently so as to allow for maximum versatility of adjustment to meet any specific cargo hauling application. The various locks 40, 42, 44, 58, 60, 90, 92, 94, 96 allow the fixing of the various components in specific operating positions and angular orientations as desired to meet an application need.

Figure 4A:
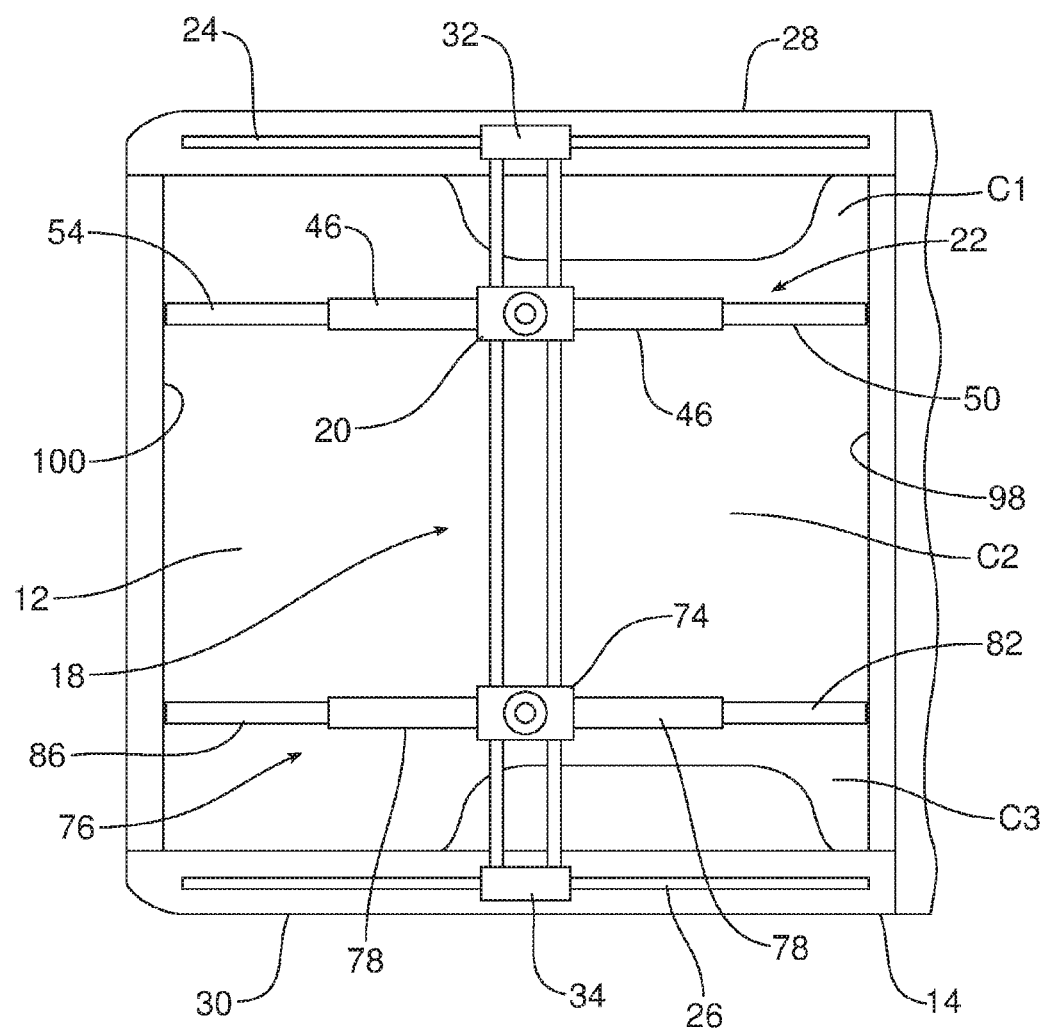
FIGS. 4a-4c are top plan views illustrating just three of the virtually infinite number of possible configurations of the bed divider.
Figure 4B:
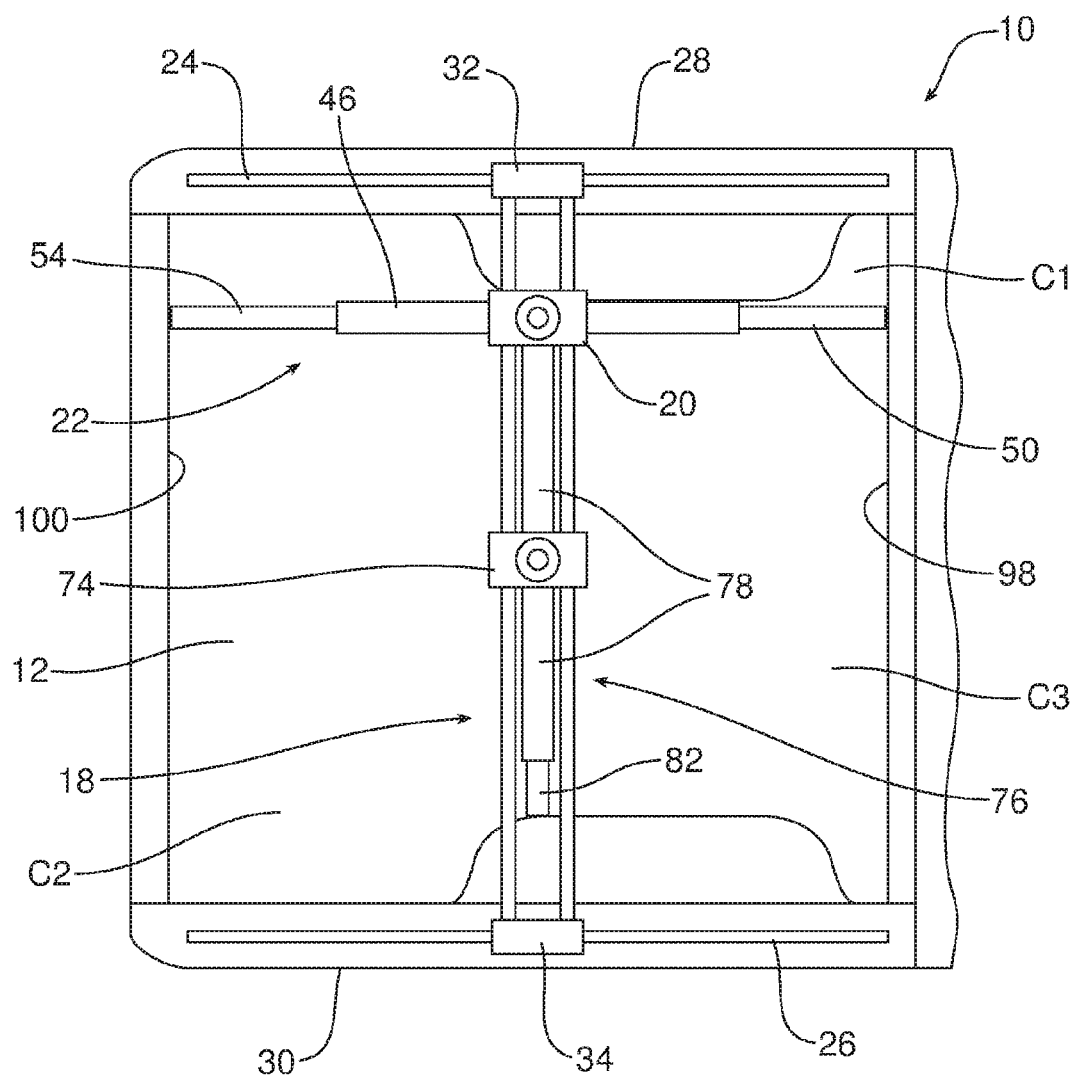
Figure 4C:
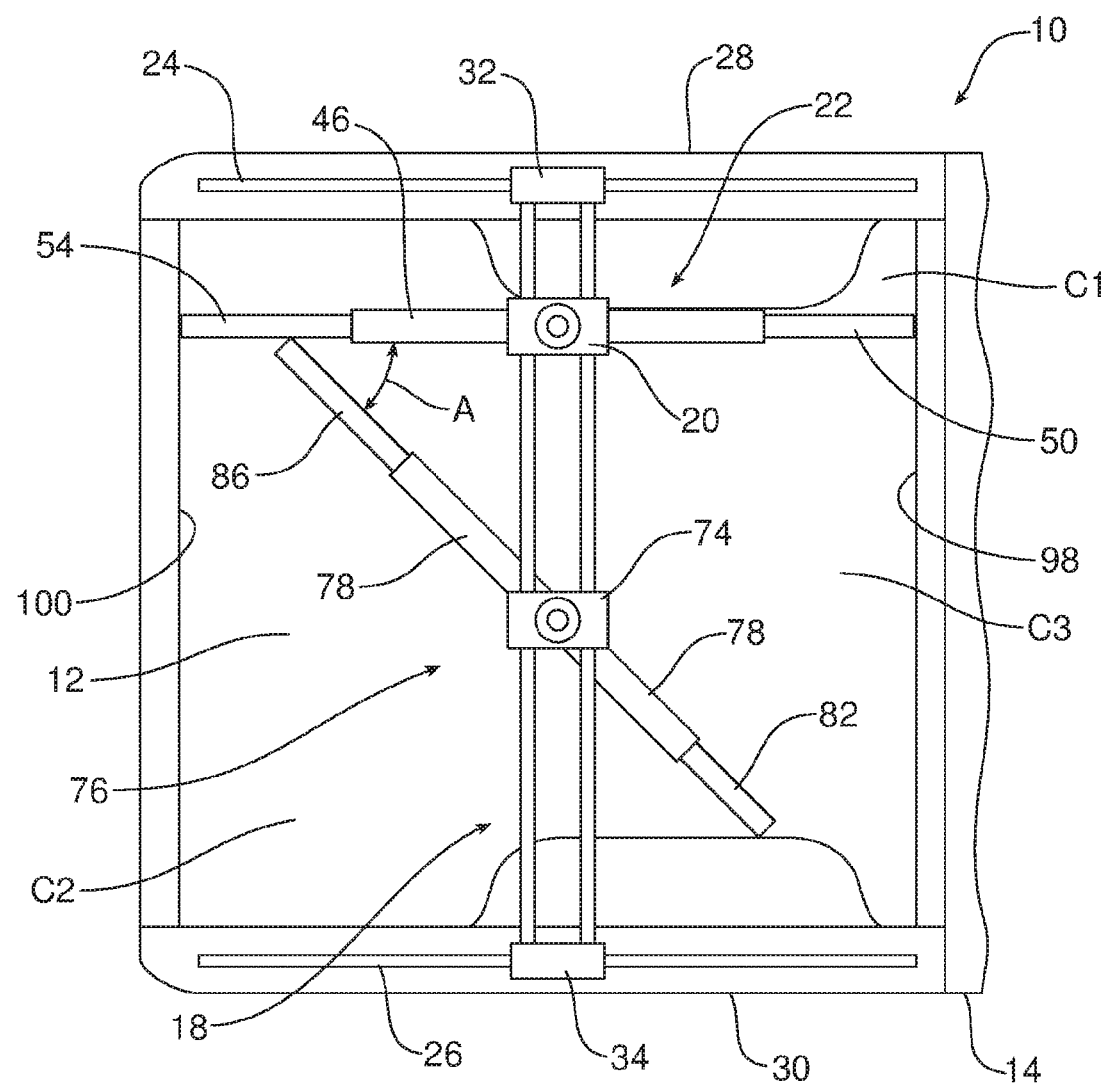

FIGS. 4a-4c show just three possible additional orientations of the first partition 22 and second partition 76. More specifically, in FIG. 4a, the first carrier 20 is positioned on the second guide track 18 adjacent the first truck bed sidewall 28 while the second carrier 74 is positioned along the second guide track 18 adjacent the truck bed sidewall 30.

The second panel 50 and the third panel 54 have both been fully extended from the first panel 46 so that the partition 22 extends continuously from the front end 98 to the rear end 100 of the bed 12. Similarly, the fifth panel 82 and sixth panel 86 have been fully extended from the fourth panel 78 so that the second partition 76 extends continuously from the front end 98 to the rear end 100 of the bed 12.

In FIG. 4b, the first partition 22 is oriented in an operative position very similar to that illustrated in FIG. 4a. In contrast, the second carrier 74 has been shifted along the second guide track 18 toward the center of the bed 12 and the fifth and sixth panels 82, 86 of the second partition 76 have been shifted within the fourth panel 78 so that the second partition 76 extends continuously from the first partition 22 to the truck bed sidewall 30. Here the second partition 76 is perpendicular to the first partition 22.

Finally, in FIG. 4c, the first partition 22 is again positioned so as to extend from the front end 98 to the rear end 100 of the bed 12 while the second partition 76 has been rotated to form an acute included angle A with the first partition and extends between the first partition 22 and the truck bed sidewall 30 with the telescoping fifth panel 82 and sixth panel 86 adjusted in the fourth panel 78 to again provide a continuous partition between the first partition 22 and that truck bed sidewall 30.

It should be appreciated that FIGS. 4a-4C illustrate just three of what is virtually an infinite number of possible partition configurations allowing the bed 12 to be configured into multiple cargo areas C1, C2, C3 of different shapes and sizes to meet virtually any cargo carrying application.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed is:

1. A bed divider for a bed of a truck, comprising:
a first guide track extending along a first axis;
a second guide track extending along a second axis, said second guide track being displaceable along said first guide track;
a carrier displaceable along said second guide track; and
a partition depending from said carrier wherein said partition comprises a first panel mounted by a rotatable connector to said carrier, a second panel telescopingly received in a first end of said first panel and a third panel telescopingly received in a second end of said first panel.

2. The bed divider of claim 1, wherein said first axis corresponds to an X-axis of said truck and said second axis corresponds to a Y-axis of said truck.

3. The bed divider of claim 1, including a rotatable connector between said carrier and said partition allowing said partition to be angled with respect to said carrier.

4. The bed divider of claim 1, further including a second carrier displaceable along said second guide track and a second partition depending from said second carrier.

5. A bed divider for a bed of a truck, comprising:
a first guide track extending along a first axis;
a second guide track extending along a second axis, said second guide track being displaceable along said first guide track;
a carrier displaceable along said second guide track;
a partition depending from said carrier; and
a rotatable connector between said carrier and said partition allowing said partition to be angled with respect to said carrier.

6. The bed divider of claim 5, wherein said first guide track includes a first guide rail and a second guide rail.

7. The bed divider of claim 6, wherein said second guide track includes a first slide and a second slide, wherein said first slide slides along said first guide rail and said second slide slides along said second guide rail.

8. The bed divider of claim 7, further including a first lock to fix said second guide track in a first operating position along said first guide track.

9. The bed divider of claim 8, further including a second lock to fix said carrier in a second operating position along said second guide track.

10. The bed divider of claim 9, further including a third lock to fix said partition at a selected angle with respect to said carrier.

11. The bed divider of claim 10, wherein said partition comprises a first panel mounted by said rotatable connector to said carrier, a second panel telescopingly received in a first end of said first panel and a third panel telescopingly received in a second end of said first panel.

12. The bed divider of claim 11, further including a fourth lock to fix said second panel with respect to said first panel and a fifth lock to fix said third panel with respect to said first panel.

13. The bed divider of claim 12, further including a second carrier displaceable along said second guide track and a second partition depending from said second carrier.

14. The bed divider of claim 13, wherein said second partition comprises a fourth panel mounted by a second rotatable connector to said second carrier, a fifth panel telescopingly received in a third end of said fourth panel and a sixth panel telescopingly received in a fourth end of said fourth panel.

15. The bed divider of claim 14, further including a sixth lock to fix said second carrier in a third operating position along said second guide track.

16. The bed divider of claim 15, further including a seventh lock to fix said second partition at a second selected angle with respect to said second carrier.

17. The bed divider of claim 16, further including an eighth lock to fix said fifth panel with respect to said fourth panel and a ninth lock to fix said sixth panel with respect to said fourth panel.

18. The bed divider of claim 7, wherein said second guide track includes a third guide rail and a fourth guide rail.

19. The bed divider of claim 10, wherein said second guide track includes a plurality of locking apertures and said second lock comprises a pin received in a fixing aperture in said carrier and one of said plurality of locking apertures in said second guide track.

20. The bed divider of claim 19, wherein said third lock comprises a threaded knob received on a threaded shaft attached to said partition.

* * * * *